United States Patent [19]

Hamermesh et al.

[11] 4,303,727

[45] Dec. 1, 1981

[54] INTUMESCENT FLAME-RESISTANT COATING

[75] Inventors: Charles L. Hamermesh, Westlake Village; Chiang-Ying M. Tung, Thousand Oaks; Peter A. Hogenson, Long Beach, all of Calif.

[73] Assignee: Rockwell International Corporation, El Segundo, Calif.

[21] Appl. No.: 196,905

[22] Filed: Oct. 14, 1980

[51] Int. Cl.$^3$ .......................... B32B 3/26; B32B 5/18; B32B 27/40; B05D 3/02

[52] U.S. Cl. ................................. 428/314; 427/244; 427/373; 427/391; 427/393; 427/393.3; 427/393.5; 428/315; 428/425.1; 428/473.5; 528/73

[58] Field of Search ..................... 427/393.3, 391, 373, 427/244, 393, 389.9, 393.5; 428/423.1, 314, 315, 425.1, 473.5; 528/73

[56] References Cited

U.S. PATENT DOCUMENTS 3,497,469  2/1970  Blair .............................. 428/423.1 X Primary Examiner—Michael R. Lusignan
Attorney, Agent, or Firm—H. Fredrick Hamann; Craig O. Malin

[57] ABSTRACT

A plastic coating is provided which protects coated structures from flame. The coating is a product resulting from mixing an aromatic polyisocyanate, an aromatic polycarboxylic compound, and furfuryl alcohol at a temperature less than 80° C. The structure to be protected from flame is coated with the product and the product is then dried. If the coated structure is exposed to flame, the coating intumesces to form a flame-resistant foam which protects the structure.

8 Claims, No Drawings

INTUMESCENT FLAME-RESISTANT COATING

BACKGROUND OF THE INVENTION

1. Field of the Invention

This invention relates to the field of plastic coatings and particularly to the field of flame-resistant plastic coatings.

2. Description of the Prior Art

Many structures such as fiberboard or cardboard containers have poor flame resistance. Although their flame resistance can frequently be improved by incorporating additives in the fiberboard formulation, these additives generate toxic volatiles when pyrolyzed. Insulative foam can be attached to the exterior of such structures, but the large volume of the foam reduces the useful space.

Another approach used to improve the flame resistance of structures is to paint them with intumescent coatings. These are paints which contain an intumescing agent. When heated, the paint expands and insulates the structure from the flame by increasing the distance between the flame and the surface of the structure. One intumescent paint which has been reported (NASA Tech Briefs, Summer 1979, page 224) has a fluorocarbon latex resin base plus a pigment and miscellaneous additives. This waterbased paint has approximately 40% of an intumescing agent such as sulfanilamide, melamine pyrophosphate, or polysulfonamide derivatives of polycyclic aromatic compounds.

Prior art intumescent coatings suffer from one or more of several shortcomings. In some cases, a toxic gas is generated during intumescing which increases the hazard to persons present during a fire. Frequently the efficiency of the coating decreases in the presence of moisture because of the ionic character of the intumescent agents used. Additionally, the expanded coating may be weak and friable, causing it to erode rapidly from the structure's surface by the impinging flame and hot gases.

SUMMARY OF THE INVENTION

It is an object of the invention to provide a method of improving the flame resistance of a structure.

It is an object of the invention to provide an improved intumescent coating.

It is an object of the invention to provide a structure with an intumescent coating which does not emit a large volume of toxic gases during intumescence.

It is an object of the invention to provide a structure with an intumescent coating which resists degradation by moisture.

It is an object of the invention to provide a structure with an improved intumescent coating which produces a flame-resistant foam by intumescence.

It is an object of the invention to provide a structure with an intumescent coating which produces an erosion resistant foam by intumescence.

According to the invention, the structure to be protected from flame is coated with a plastic which foams, or intumesces, when heated and produces a stable, flame-resistant foam. This foam insulates the structure and helps protect it from being damaged by fire. The plastic is a mixture of an aromatic polyisocyanate, an aromatic polycaboxylic compound, and furfuryl alcohol which is maintained at a temperature less than about 80° C. in order to prevent the mixture from foaming.

In a preferred embodiment, 20 to 60% by weight of polyaryl polyisocyanate is mixed with 10 to 40% by weight of pyromellitic dianhydride and with 25 to 60% by weight of furfuryl alcohol. The mixture is then applied to a substrate material such as cardboard and dried at a temperature less than about 80° C. The result is a thin, relatively stable plastic coating which resists degradation by moisture. When the cardboard is exposed to a flame or heat, such as during a fire, the coating intumesces to form an insulating foam around the cardboard. This foam helps to insulate the substrate material from the heat of the fire and reduces the probability that it will burn.

DESCRIPTION OF THE PREFERRED EMBODIMENT

The present invention is in the field of coatings; however, it draws upon the field of making foams, particularly polyimide foams. U.S. Pat. No. 3,300,420 to H. E. Frey describes a foam and a method of producing the foam from aromatic anhydrides and isocyanates. According to the Frey patent, the reactants are mixed together and then heated to 300° F. to about 700° F. to form either a solid foam product or a prepolymerized intermediate useful for forming solid polymeric products.

U.S. Pat. No. 4,184,021 to Sawko, Riccitiello, and Hamermesh (one of the present inventors) describes a method of preparing a polyimide foam in which the required heating is obtained by including in the reactants furfuryl alcohol and phosphoric acid. During mixing of the reactants, the furfuryl alcohol and phosphoric acid produce a vigorous exothermic reaction which provides the heat that is necessary for the formation of the polyimide structure.

In work leading to the present invention, it was discovered that when an aromatic polyisocyanate, an aromatic polycarboxylic compound, and furfuryl alcohol are mixed at temperatures less than 80° C., the isocyanate reacts with the furfuryl alcohol to form a carbamate during the mixing process. The mixture is a liquid that can be applied to a surface by brushing, spraying, or dipping and dries to form a varnish-like coating. The coating is quite stable. Because of its organic nature, it is less sensitive to moisture than prior art intumescent paints which use ionic, inorganic or organic salts.

Aromatic polyisocyanates which can be used to prepare the coatings of this invention comprise compounds that contain at least two isocyanate groups and are normally liquid or can become liquid at reaction temperatures. The preferred compounds have at least two aromatic rings with one isocyanate group on each ring. These rings may be connected together as in biphenyl, or interconnected by either carbonyl, sulfone, methylene or oxygen linkages. Examples of suitable compounds are: diphenylmethane-4,4'-diisocyanate, 3,3'-dimethyldiphenylmethane-4,4'-diisocyanate, 3,3'-dimethyldiphenylmethane-4,4'-diisocyanate, biphenyl diisocyanate, diphenylsulfone diisocyanate, and the like. Particularly useful are polymethylenephenylene polyisocyanate, 4,4'-diphenylenenemethylene diisocyanate, and polymethylene polyphenylisocyanate. Examples of monophenylene polyisocyanates are toluene diisocyanate, m-phenylene diiosocyanate, and xylylene diisocyanate.

The aromatic polycarboxylic compounds which can be used to prepare the coatings of this invention comprise such polycarboxylic compounds as can form intramolecular anhydride and, after reaction with an isocyanate group, imide linkages. Example of such compounds include the following dianhydrides of polycarboxylic acids: pyrometallic acid, benzene-1,2,3,4-tetracarboxylic acid, diphenyl-3,3',4,4'-tetracarboxylic acid, diphenyl-2,2',3,3'-tetracarboxylic acid, naphthalene-2,3,6,7,-tetracarboxylic acid, naphthalene-1,2,4,5-tetracarboxylic acid, naphthalene-1,4,5,8-tetracarboxylic acid, as well as similar tetracarboxylic derivatives of phenanthrene, perylene, diphenyl methane, diphenyl sulfone, diphenyl ether, benzophenone, and the like.

Examples of the method used to prepare an intumescent coating according to the invention and of the properties of such coating are given below.

EXAMPLE I

An aromatic polyisocyanate, namely polymethylene polyphenylisocyanate (referred to as PAPI), was mixed with an aromatic polycarboxylic compound, namely pyromellitic dianhydride (referred to as PMDA), and with furfuryl alcohol in the amounts of 33% to 16% to 51% by weight, respectively. The three ingredients were mixed in a glass beaker using a tongue depressor. The mixing was accomplished at room temperature without applying additional external heating, and there did not appear to be any significant temperature rise due to the mixing. During mixing, a small amount (approximately 2.5%) of a surfactant, namely Dow Corning DC 193, was added to obtain the proper viscosity and control the foaming.

Infrared spectroscopy studies show that the isocyanate reacts with the furfuryl alcohol during mixing to form a carbamate.

The resulting mixture was an unfoamed, varnish-like material which was applied to one side of a cardboard box material using the tongue depressor. It was applied promptly after mixing, or should be applied within 30 minutes after mixing.

The coating dried on the cardboard in about 24 hours at room temperature. It adhered to the cardboard and looked very much like a rather thick varnish.

A flame from a bunsen burner was directed onto the dried, coated surface. The coating immediately expanded to form a polyimide foam. Because of the thermal stability of the imide structure, little if any burning occurred, and that burning which may have occurred extinguished immediately after removal of the flame. Similar flame resistance was observed when the coated surface was exposed directly to a flame from a pool of heptane fuel.

Preliminary examination of moisture sensitivity of the coating showed that a coating which had been aged at room temperature for three weeks would still form a foam when exposed to a flame. The aged coating would still foam satisfactorily even after being exposed to steam for two hours.

EXAMPLE II

A mixture was prepared in the manner described in Example I except that the quantities of PAPI, PMDA, and furfuryl alcohol were 29.0%, 14.5%, and 56.5%, respectively. The mixture could be applied as a coating which intumesces when heated as previously described.

EXAMPLE III

A mixture was prepared in the manner described in Example I except that the aromatic polycarboxylic compound used was benzophenone-3,3'4,4'-tetracarboxylic acid dianhydride (BTDA) rather than PMDA. The quantities of PAPI, BTDA, and furfuryl alcohol used were 30.3%, 22.4%, and 47.3% respectively. The mixture could be applied as a coating which intumesces when heated as previously described.

EXAMPLE IV

An intumescent coating could be prepared as described in Example I except that the quantities of PAPI, PMDA, and furfuryl alcohol would be 48.0%, 15.5%, and 36.5%, respectively.

The toxicity of foams having compositions analogous to the above examples has been inferred from gas analysis of the species generated during pyrolysis. No gases other than carbon monoxide, carbon dioxide, and methane were observed.

While the above examples utilize polymethylene polyphenylisocyanate (PAPI) and either pyromellitic dianhydride (PMDA) or benzophenone-3,3',4,4'-tetracarboxylic acid dianhydride (BTDA), other aromatic polyisocyanates and aromatic polycarboxylic compounds can be used in the mixture as previously mentioned. Similarly, the amounts of reactants can be regulated to give desired properties to the mixture before coating, to the coating itself, and to the foamed coating. Selection from these ingredients and their quantities can be optimized within the skill of the artisan by preparing mixtures and evaluating their properties and the properties of the resulting coating and foam to meet the detailed requirements of specific applications. Broadly speaking, coatings within the scope of the invention can be prepared by mixing aromatic polyisocyantes, aromatic polycarboxylic compounds, and furfuryl alcohol in the range of 20 to 60%, 10 to 40%, and 25 to 60%, respectively.

Similarly, various other materials can be added to the essential ingredients described above to obtain particular properties for specific applications. Silicon oil surfactants such as Dow Corning's DC 193 or 195 are particularly useful in obtaining a suitable foam. Fillers, coloring agents, preservatives, stabilizers, and other materials can be added in conventional quantities for the known effects they produce.

The mixture can be applied to structures using conventional methods of coating or painting surfaces provided that the mixture is applied within its approximately 30 minute pot life. For example, surfaces can be coated by brushing, dipping, spraying with either single component or double component systems, and rolling. The thickness can be selected based upon the amount of foamed material needed in the application. If necessary, several coats of the mixture can be applied to obtain the desired thickness.

The mixture can be applied to many different substrates including paper, wood, plastic, and fabrics to help protect these substances from burning. Non-combustible substrates such as metals can be coated to increase their effectiveness as a heat barrier, for example fire walls in buildings, in cars, and other structures in which fire can be a problem.

Air drying the applied coating at room temperature has proven to be satisfactory for the examples given. However, in some cases it may be advantageous to promote drying by heating. In such cases, the drying temperature should be kept below 80° C. to prevent any foaming of the mixture.

In many applications, the coating can be applied to a structure and not foamed until an emergency (fire) occurs, at which time the coating foams automatically. In other applications, the coating can be applied and then foamed during the manufacture of the part so that the finished structure includes the foam.

Numerous variations and modifications can be made without departing from the invention. Accordingly, it should be clearly understood that the form of the invention described above is illustrative only and is not intended to limit the scope of the invention.

What is claimed is:

1. A method of improving the flame resistance of a structure comprising the steps of:
   providing an aromatic polyisocyanate;
   providing an aromatic polycarboxylic compound;
   providing furfuryl alcohol;
   mixing said aromatic polyisocyanate, said aromatic polycarboxylic compound, and said furfuryl alcohol in the range of: 20 to 60% aromatic polyisocyanate, 10 to 40% aromatic polycarboxylic compound and 25 to 60% furfuryl alcohol;
   coating a surface of the structure with the product of said mixing step; and
   drying said product, said steps of mixing, coating and drying being accomplished at less than 80° C., whereby said product forms a coating which intumesces when heated to form a polyimide foam.

2. The method as claimed in claim 1, including the step of providing a surfactant and adding approximately 2 to 5% of said surfactant during said mixing step.

3. A method of improving the flame resistance of a structure, comprising the steps of:
   providing polymethylene polyphenylisocyanate;
   providing pyromellitic deanhydride;
   providing furfuryl alcohol;
   providing a surfactant;
   mixing said polymethylene polyphenylisocyanate, said pyromellitic dianhydride, and said furfuryl alcohol in the range of: 20 to 60% polymethylene polyphenylisocyanate, 10 to 40% pyromellitic dianhydride, and 25 to 60% furfuryl alcohol, and 2 to 5% surfacant;
   coating a surface of the structure with the product of said mixing step; and
   drying said product, said steps of mixing, coating, and drying being accomplished at less than 80° C., whereby said product forms a coating which intumesces when heated to form a polyimide foam.

4. A structure having a coating which intumesces when heated to form a polyimide foam, comprising:
   a substrate;
   a coating on said substrate, said coating comprising a product resulting from mixing 20 to 60% of an aromatic polyisocyanate with 10 to 40% of an aromatic polycarboxylic compound with 25 to 60% furfuryl alcohol, said product being maintained at a temperature less than approximately 80° C.

5. The structure as claimed in claim 4, wherein said product includes approximately 2 to 5% surfactant.

6. A structure having a coating which intumesces when heated to form a polyimide foam, comprising:
   a substrate;
   a coating on said substrate, said coating comprising a product resulting from mixing 20 to 60% polymethylene polyphenylisocyanate with 10 to 40% pyromellitic dianhydride, 25 to 60% furfuryl alcohol, and 2 to 5% surfactant, said product being maintained at a temperature less than approximately 80° C.

7. A structure having a coating which intumesces when heated to form a polyimide foam, comprising:
   a substrate;
   a coating on said substrate, said coating comprising a product resulting from mixing 20 to 60% polymethylene polyphenylisocyanate with 10 to 40% benzophenone-3,3'4,4'-tetracarboxylic acid dianhydride (BTDA), 25 to 60% furfuryl alcohol, and 2 to 5% surfactant, said product being maintained at a temperature less than approximately 80° C.

8. A method of improving the flame resistance of a structure, comprising the steps of:
   providing polymethylene polyphenylisocyanate;
   providing benzophenone-3,3'4,4-tetracarboxylic acid dianhydride (BTDA);
   providing furfuryl alcohol;
   providing a surfactant;
   mixing said polymethylene polyphenylisocyanate, said BTDA, and said furfuryl alcohol in the range of: 20 to 60% polymethylene polyphenylisocyanate, 10 to 40% BTDA, and 25 to 60% furfuryl alcohol, and 2 to 5% surfactant;
   coating a surface of the structure with the product of said mixing step; and
   drying said product, said steps of mixing, coating, and drying being accomplished at less than 80° C., whereby said product forms a coating which intumesces when heated to form a polyimide foam.

* * * * *